(12) United States Patent
Garnara et al.

(10) Patent No.: US 12,216,533 B2
(45) Date of Patent: *Feb. 4, 2025

(54) SYSTEMS AND METHODS FOR DETECTING SOFTWARE ERRORS

(71) Applicant: Capital One Services, LLC, McLean, VA (US)

(72) Inventors: Mehulkumar Jayantilal Garnara, Glen Allen, VA (US); Vamsi Kavuri, Glen Allen, VA (US); Soumyajit Ray, Glen Allen, VA (US); Lee Adcock, Midlothian, VA (US); Santhi Sridharan, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/417,874

(22) Filed: Jan. 19, 2024

(65) Prior Publication Data

US 2024/0152420 A1    May 9, 2024

Related U.S. Application Data

(63) Continuation of application No. 17/717,718, filed on Apr. 11, 2022, now Pat. No. 11,899,529.

(51) Int. Cl.
*G06F 11/07* (2006.01)
*G06F 40/14* (2020.01)
*G06V 30/418* (2022.01)

(52) U.S. Cl.
CPC ........ *G06F 11/079* (2013.01); *G06F 11/0709* (2013.01); *G06F 11/0766* (2013.01); *G06F 11/366* (2013.01); *G06F 40/14* (2020.01); *G06V 30/418* (2022.01)

(58) Field of Classification Search
CPC ... G06F 11/0766; G06F 11/302; G06F 11/366
See application file for complete search history.

(56) References Cited

FOREIGN PATENT DOCUMENTS

| CN | 111752793 A | * | 10/2020 |
| CN | 114579446 A | * | 6/2022 |

* cited by examiner

*Primary Examiner* — Yolanda L Wilson
(74) *Attorney, Agent, or Firm* — Foley & Lardner LLP

(57) ABSTRACT

A computing system may determine that a change has occurred in a software application or a document object model associated with a software application. The computing system may obtain a current copy of a document object model (DOM) associated with the application and a current screenshot of a screen displaying the application (e.g., in response to determining that the change in the DOM has occurred). If the current copy of the DOM is determined to be similar to the screenshot, the computing system may save storage space by storing the current copy of the DOM and discarding the screenshot. The computing system may store the current copy of the DOM in a memory buffer. The computing system may send the DOM copies or screenshots stored in the memory buffer to the monitoring system, for example, if an error in the application is detected.

20 Claims, 6 Drawing Sheets

SYSTEMS AND METHODS FOR DETECTING SOFTWARE ERRORS

CROSS-REFERENCE TO RELATED APPLICATION(S)

This application is a continuation of U.S. patent application Ser. No. 17/717,718, filed Apr. 11, 2022. The content of the foregoing application is incorporated herein in its entirety by reference.

BACKGROUND

Software bugs or errors can cause software to crash or otherwise perform in unexpected ways. Incorrect performance due to software errors may lead to poor user experiences as the user is unable to complete tasks or may lose important data. Due to the complexity of software, it can be difficult to determine the exact cause of errors in software and potential fixes that prevent the errors from occurring in the future.

SUMMARY

Conventional computing systems may deploy error reporting systems that track data from a from a variety of sources to determine errors in software applications. Conventional techniques for reporting application errors require the collection of vast amounts of data from the time right around when the application error occurs (e.g., right when the application crashes, becomes unresponsive, etc.). Much of the data may be irrelevant and can be overwhelming to parse through to determine the cause of the error. Additionally, the data may be missing critical information that led to the error but occurred long before the error manifested. Conventional systems may not efficiently track critical data necessary for determining the cause of a software error. For example, some conventional systems may collect a snapshot of the system and memory contents at the time of the error (e.g., at the time of the system crashing). However, the system may not be able to collect these snapshots for a period of time (e.g., 24 hours) because it may require too many resources (e.g., storage space and processing resources) to perform these operations. In another example, a system may collect only some data over a period of time (e.g., monitoring logs). However, this data may not be enough to be able to troubleshoot an application issue. For example, monitoring logs may not make clear what the root cause of an error is, making it difficult to reproduce the error. As a result, despite the error being reported, a fix for the error may not be achieved.

To address these or other issues, non-conventional techniques described herein store document object model data targeted to a particular application such that all relevant data for a particular error can be tracked, and, for example, sent to a monitoring system, to be used in fixing an error in the application. In some embodiments, a machine learning model may be used with the screenshot and a corresponding document object model (DOM) representation of the application from which the screenshot is taken. The machine learning model may determine whether the DOM can be used to accurately reproduce the screenshot. If so, the DOM is stored instead of the screenshot, thus reducing the amount storage needed and the amount of bandwidth needed to send the data to the monitoring system.

In some embodiments, a computing system may determine that a change has occurred in a software application or a document object model associated with a software application. For example, the computing system may determine that data displayed in connection with an application has changed in response to input received from a user. A DOM associated with the application may include a tree structure including nodes representative of portions of a web page. The computing system may obtain a current copy of the DOM and a current screenshot of a screen displaying the web application (e.g., in response to determining that the change in the DOM has occurred). For example, in response to a change in information displayed by the application, the computing system may take a screenshot of the application and obtain a copy of the DOM corresponding to the screenshot. The computing system may generate, based on the current copy of the DOM, an estimated rendering of the application. For example, the estimated rendering may be an estimate of what a user would see if data or code stored in the DOM was rendered by the application or the computing system.

The computing system may determine whether the current screenshot matches the current copy of the DOM. For example, the computing system may use a machine learning model to determine whether a similarity metric (e.g., indicating a level of similarity between the current copy of the DOM and the screenshot) satisfies a threshold. If the current copy of the DOM is determined to be similar to the screenshot, the computing system may save storage space by storing the current copy of the DOM and discarding the screenshot. The computing system may store the current copy of the DOM in a memory buffer or in another suitable location. If the memory buffer is full, the computing system may replace an older copy of the DOM in the memory buffer with the current copy of the DOM. The computing system may send the DOM copies and/or screenshots stored in the memory buffer or in another suitable location to the monitoring system, for example, if an error in the application is detected.

In some embodiments, instead of or in addition to the DOM, a different data structure may be used. For example, the computing system may use any data structure that enables rendering of an application and/or the application screen and capturing the application state. For example, any data structure that uses a tree structure including nodes representative of portions of an application may be used with embodiments of this disclosure. In some embodiments, another type of data structure may be used.

Various other aspects, features, and advantages of the disclosure will be apparent through the detailed description of the disclosure and the drawings attached hereto. It is also to be understood that both the foregoing general description and the following detailed description are examples and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion," refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the disclosure. It will be appreciated, however, by those having skill in the art, that the disclosure may be practiced without these specific details or with an equivalent arrangement. In other cases, some structures and devices are shown in block diagram form to avoid unnecessarily obscuring the disclosure.

Figure 1:
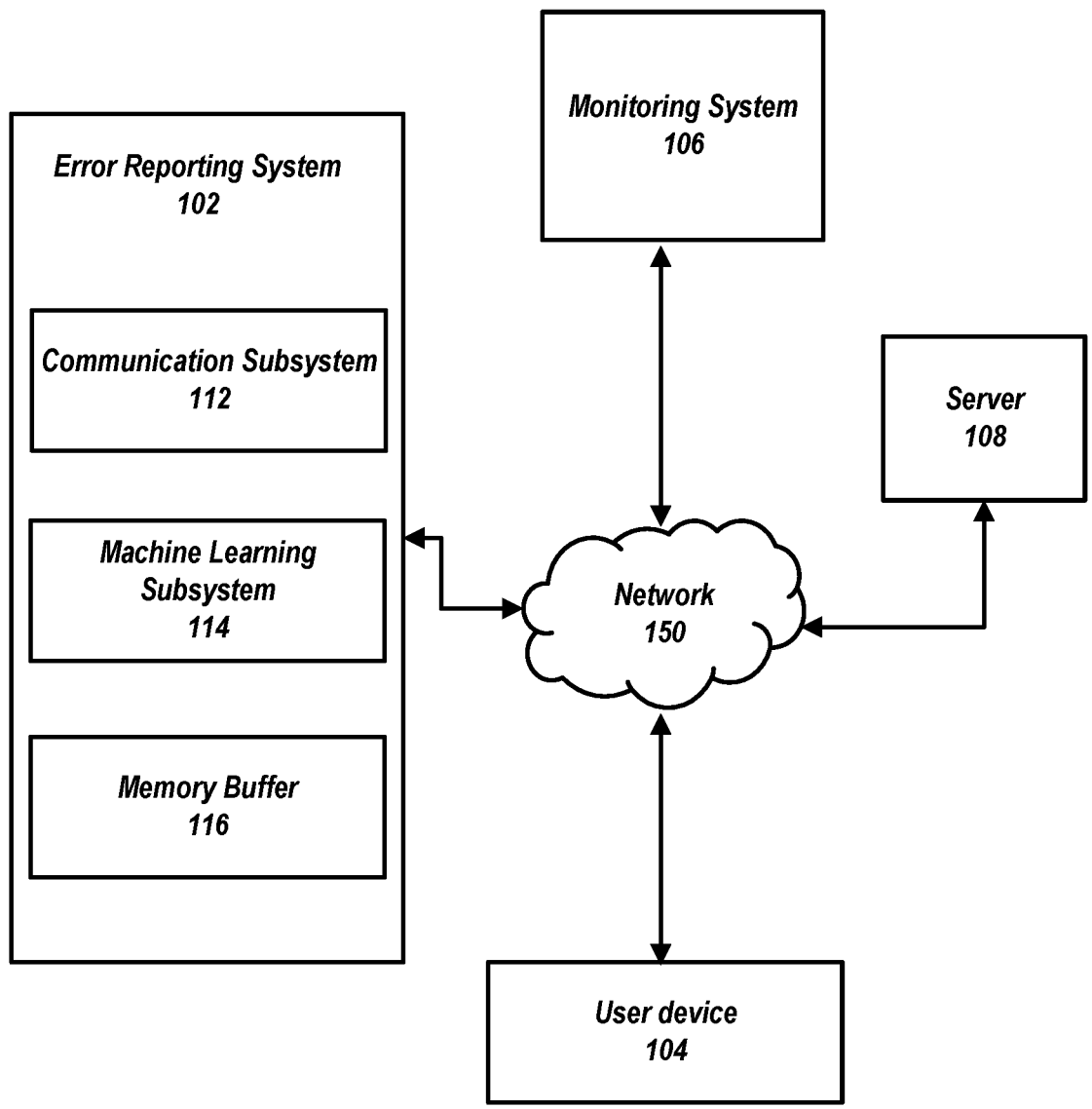
FIG. 1 shows an example system for reporting errors in software, in accordance with some embodiments.

FIG. 1 shows an example computing system 100 for reporting software errors. The system 100 may include an error reporting system 102, a user device 104, a monitoring system 106, or a server 108. The error reporting system 102 may include a communication subsystem 112, a machine learning (ML) subsystem 114, a memory buffer 116, or other components. The error reporting system 102 may be implemented in software and may execute on the user device 104. The communication subsystem 112 may receive input from the user device 104 from the monitoring system 106.

Figure 2A:
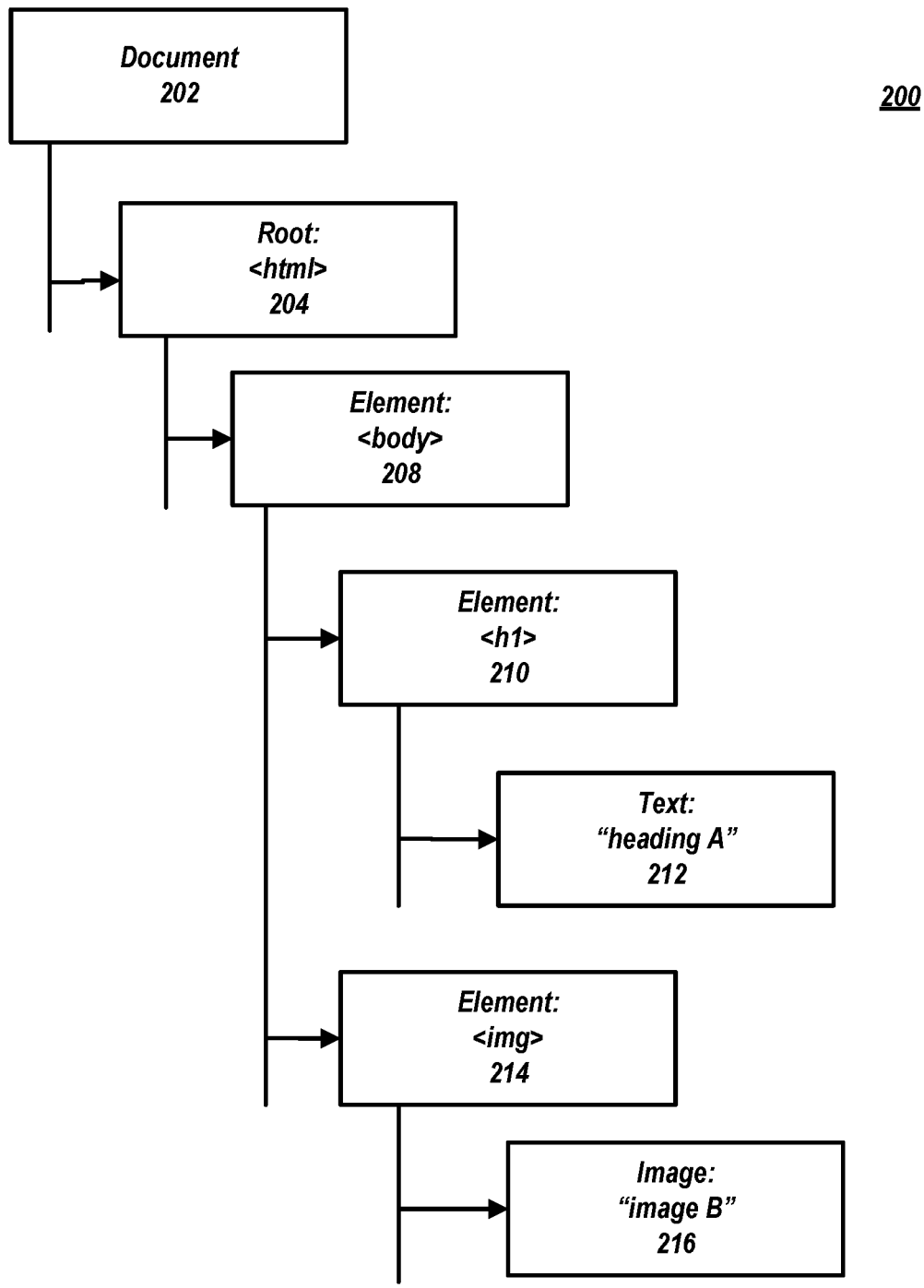
FIG. 2A shows an example of a data structure (e.g., document object model), in accordance with some embodiments.

The error reporting system 102 may detect changes made during the use of an application. An application may be any software that may be executed on a computing device. For example, an application may be a mobile application, a web application (e.g., that involves communication between one or more servers and the user device 104), or a variety of other software applications. The application may be associated with a document object model (DOM). A DOM may include a tree structure comprising nodes representative of portions of an application. A DOM may be structured as XML, JSON, or in a variety of other techniques. A DOM may include any data that is used to generate a user interface, web page, or other portion of an application. For example, if the application is a web application the document object model may include a representation of HTML, CSS, JavaScript, or other components of the web application. Referring to FIG. 2A, an example DOM 200 is shown. The example DOM 200 is representative of HyperText Markup Language (HTML) code of a web page that may be generated via an application executing on the server 108 or the user device 104. The DOM 200 includes a document node 202. Under the document node 202 is the root node 204, which includes an <html> tag. Under the root node 204 is the element node 208 which includes the <body> tag. The element node 208 includes the element 210 and element 214 nodes which include text and an image of the web application. The DOM 200 may be used to generate a web page or a screenshot of a web page that contains the text 212 and the image 216.

The error reporting system 102 may determine that a change has occurred in the application. The change in the application may be reflected by a change in a DOM that corresponds to the application. The error reporting system 102 may detect changes that are made with user input or without user input. For example, a user may interact with a user interface element and additional content may be displayed by the application in response to the interaction. The additional content may be represented by an updated or current copy of the DOM. The error reporting system 102 may detect changes that are made without input from a user. For example, the application may periodically change advertisements that are displayed in the application. The change in advertisement may be represented by a change in the DOM. The error reporting system 102 may use metadata to determine whether a change has occurred in the DOM. For example, the error reporting system 102 may periodically retrieve metadata associated with the application to determine whether a change has been made. The metadata may include timestamps indicating when the last change was made to the application or corresponding DOM.

The error reporting system 102 may obtain a current copy of the DOM and a screenshot of a screen displaying the web application, for example, in response to determining that the change in the DOM has occurred. The error reporting system 102 may store either the screenshot, the current copy of the DOM, or both. The screenshot or current copy of the DOM may be useful for detecting the cause of errors in the application. For example, having multiple screenshots or copies of the DOM that show the actions taken in an application or changes made to the DOM may allow the cause of an error to be determined or fixed more efficiently. For example, the current screenshot may include an image of an interface where the web application has been rendered for display.

Any data obtained by the error reporting system 102 may be sanitized for privacy. Personal identifiable information (PII) may be removed or altered so that a particular user is no longer identifiable from the information. For example, identifying information may be removed from screenshots of a screen displaying the web application. Optical character recognition may be used to determine names, addresses, phone numbers, identification numbers, or a variety of other PII and their locations within a screenshot or copy of the DOM. The PII may be altered or removed by the error reporting system 102, for example, before it is sent to the monitoring system 106.

The error reporting system may compare the current copy of the DOM with the screenshot to determine whether the screenshot can be discarded to save space. For example, if a rendering of the DOM is determined to sufficiently match the screenshot, the error reporting system may store the current copy of the DOM or may send only the current copy of the DOM to a monitoring system (e.g., instead of sending the screenshot corresponding to the current copy of the DOM). The current copy of the DOM may take up less storage space than the screenshot. The error reporting system 102 may generate, based on the current copy of the DOM, an estimated rendering of the application. For example, error reporting system 102, may include an engine that is able to interpret the code within the DOM and render the application screen based on the DOM. In some embodiments, the engine may be a variation of a web browsing engine. The estimated rendering may include HTML code and supporting application data generated based on the DOM. The rendering may be what the application is expected to display given the data contained in the DOM. The estimated rendering may be used to determine whether the DOM is an accurate match with the screenshot as discussed in more detail below.

The error reporting system may determine whether the current screenshot matches the current copy of the DOM. For example, the estimated rendering of the current copy of the DOM and the screenshot may be input into a machine learning model (e.g., a machine learning model described in connection with FIG. 3 below) to determine whether the current copy of the DOM matches the screenshot. The machine learning model may generate a first vector representation of the screenshot and a second vector representation of the estimated rendering (e.g., of an image of the estimated rendering). That is, in some embodiments, the error reporting system may generate an image based on the estimated rendering. The machine learning model may use the vector representations to generate a similarity score. The similarity score may be compared with a threshold similarity score. For example, if the similarity score is below the threshold score, the error reporting system 102 may determine that the current copy of the DOM does not sufficiently match the screenshot. If the similarity score is above the threshold score, the error reporting system 102 may determine that the current copy of the DOM is a match for the screenshot.

The error reporting system 102 may store a limited number of DOM copies (e.g., each DOM copy may correspond to a change in an application), for example, in the memory buffer 116 (or in another suitable location). The memory buffer 116 may be one or more locations in memory or a data structure that stores screenshots or copies of DOMs. The memory buffer 116 may be variable in length and may expand or contract according to the amount of data stored within the memory buffer 116. The error reporting system 102 may determine which DOM copies to store and which DOM copies to discard. For example, the error reporting system 102 may determine that if the memory buffer 116 is full, a new DOM copy should replace an oldest DOM copy (e.g., first in first out). Alternatively, the new DOM copy may replace a second newest DOM copy (e.g., last in first out). The error reporting system 102 may discard one or more DOM copies stored in the memory buffer 116, for example, if the error reporting system 102 determines that the memory buffer 116 stores more than a threshold number of DOM copies. The threshold number may depend on the application type. For example, a web application may have a higher threshold number (e.g., 15, 60, 70, 80, etc.) than a mobile application (e.g., 6, 7, 10, etc.). In response to determining that the memory buffer stores more than the threshold number of DOM copies and that the current screenshot matches the current copy of the DOM, the error reporting system 102 may replace an oldest DOM copy of a plurality of DOM copies (e.g., stored in the memory buffer), with the current copy of the DOM. Each DOM copy of the plurality of DOM copies may correspond to a previous change made to the DOM.

Figure 2B:
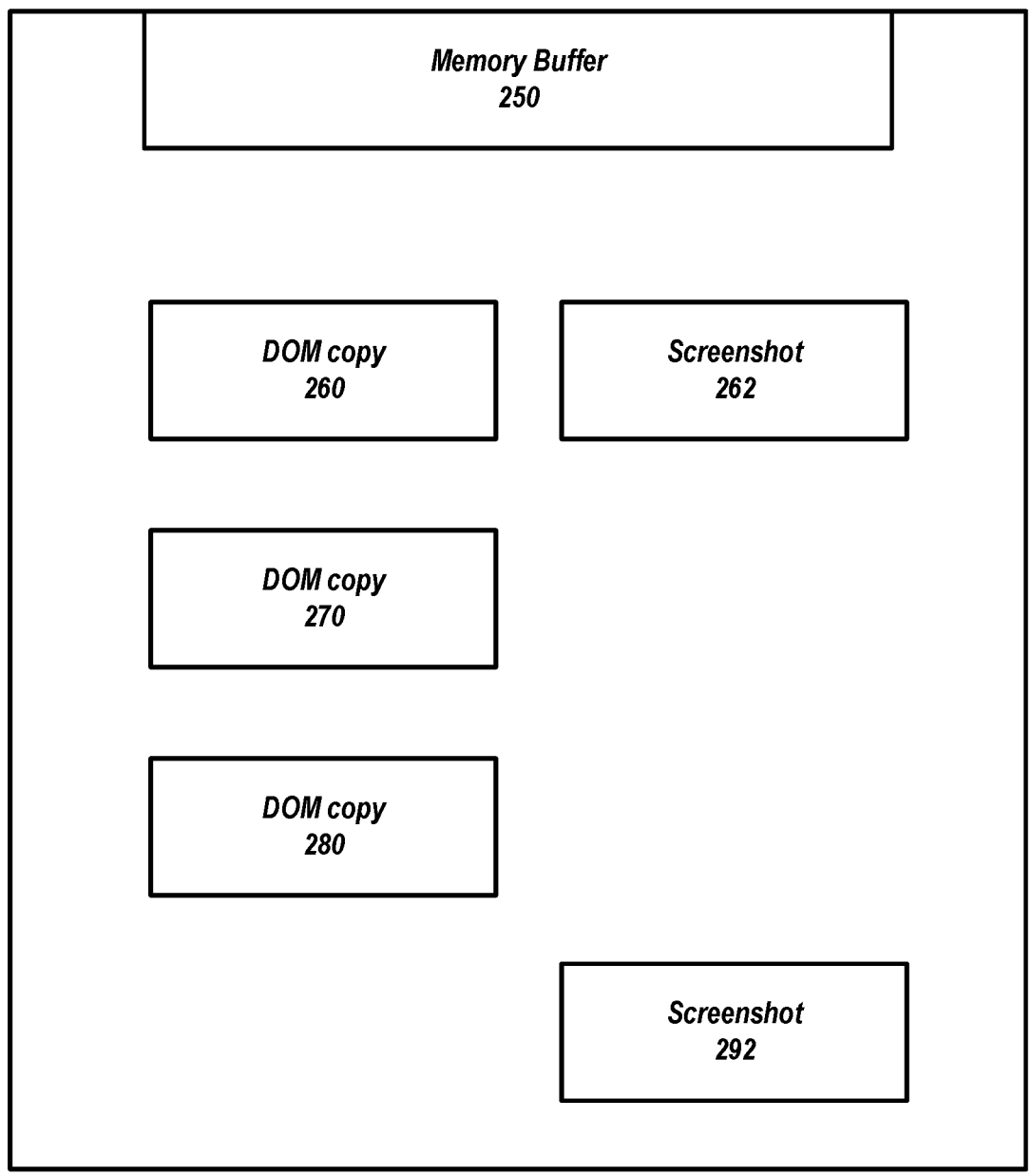
FIG. 2B shows an example representation of memory storage (e.g., a memory buffer) for reporting errors in software, in accordance with some embodiments.

Referring to FIG. 2B, in some embodiments, the error reporting system 102 may store a copy of a DOM or the screenshot of the application (e.g., a screenshot of the application taken after a change is detected in the application or DOM). In FIG. 4B, each row containing a DOM copy or screenshot may correspond to a change that occurred in the application (e.g., user input, or other change as described above). The error reporting system 102 may store the current copy of the DOM if the similarity metric is above a first threshold (e.g., 0.7, 0.8, 0.9, etc.). For example, DOM copy 270 and DOM copy 280 may correspond to changes in the application where the DOM was determined to match the screenshot taken (e.g., as described above). The error reporting system 102 may store the current copy of the DOM and the screenshot if the similarity metric is below the first threshold and above a second threshold. For example, a similarity score associated with the DOM copy 260 and screenshot 262 may have been determined to be below the first threshold but above the second threshold. In response, to falling between the first and second thresholds, both the DOM copy 260 and screenshots 262 are stored in the memory buffer 116. The error reporting system 102 may determine to store only the screenshot, for example, if the similarity metric is below the second threshold. For example, the screenshot 292 and the corresponding DOM copy may have been determined to be very different from each other (e.g., because the similarity metric was below the second threshold), and in response, only the screenshot 292 was stored in the memory buffer 250.

The error reporting system 102 may determine that an error has occurred in the application. For example, the error reporting system 102 may determine that the application has crashed, is no longer responsive to user input, or is otherwise not working correctly. The error reporting system 102 may send the contents of the memory buffer 116 to the monitoring system 106, for example, in response to determining that an error has occurred in the application. For example, the contents of the memory buffer 116 may include one or more copies of the DOM, one or more screenshots of the application, or a variety of other content. The contents of the memory buffer 116 may be used by the monitoring system 106 to determine the cause of the error or a potential solution to the cause of the error. In some embodiments, determining that an error occurred may be a detection of a user selecting an option to report an error. The option may be part of the application being used by the user, of a web browsing application, or may be another suitable option.

The error reporting system 102 may send a subset of the contents of the memory buffer 116 to a monitoring system 106. For example, the error reporting system 102 may determine an error type of the error that occurred in the application. For example, the error type may indicate a severity level of the error. If the severity level is above a threshold (e.g., the application crashed or became unresponsive), then the subset may include all the contents of the memory buffer 116. If the severity level is below a threshold, the subset may include only a threshold number (e.g., 3, 5, 15, etc.) of the most recent screenshots or DOM copies. The error reporting system 102 may determine, based on the error type of the error within the web application, a subset of the first plurality of DOM copies, and may send the subset of the DOM copies to the monitoring system 106. The error reporting system 102 may determine that some of the DOM copies in the memory buffer 116 correspond to known errors in the application. In response to determining that some of the DOM copies in the memory buffer 116 correspond to known errors in the application, the error reporting system 102 may remove the DOM copies. Additionally or alternatively, some of the DOM copies in the memory buffer 116 may be determined to be similar to DOM copies that have been previously sent to the monitoring system and thus the error reporting system 102 may determine to not include them in the subset of DOM copies.

The error reporting system 102 may collect or send additional information to a monitoring system 106. The additional information may include data associated with a browser. For example, the data may include session details, console or browser logs. The data may include a list of objects downloaded or attempted to be downloaded by the browser, response codes (e.g., HTTP response status codes) associated with each object, the object type of each object (e.g., gif, ping, script, document, etc.), the size of each object, the time taken to download each object, or a variety of other data. The additional information may be used by the monitoring system 106 to determine one or more errors.

The user device 104 may be any computing device, including, but not limited to, a laptop computer, a tablet computer, a hand-held computer, smartphone, other computer equipment (e.g., a server or virtual server), including "smart," wireless, wearable, or mobile devices. The error reporting system 102 may include one or more computing devices described above or may include any type of mobile terminal, fixed terminal, or other device. For example, the error reporting system 102 may be implemented as a cloud-computing system and may feature one or more component devices. A person skilled in the art would understand that system 100 is not limited to the devices shown in FIG. 1. Users may, for example, utilize one or more other devices to interact with devices, one or more servers, or other components of system 100. A person skilled in the art would also understand that while one or more operations are described herein as being performed by particular components of the system 100, those operations may, in some embodiments, be performed by other components of the system 100. As an example, while one or more operations are described herein as being performed by components of the error reporting system 102, those operations may be performed by components of the user device 104, or monitoring system 106. In some embodiments, the various computers and systems described herein may include one or more computing devices that are programmed to perform the described functions.

One or more components of the error reporting system 102, user device 104, or monitoring system 106, may receive content or data via input/output (hereinafter "I/O") paths. The one or more components of the error reporting system 102, the user device 104, or the monitoring system 106 may include processors or control circuitry to send and receive commands, requests, and other suitable data using the I/O paths. The control circuitry may include any suitable processing, storage, or I/O circuitry. Each of these devices may include a user input interface or user output interface (e.g., a display) for use in receiving and displaying data. It should be noted that in some embodiments, the error reporting system 102, the user device 104, or the monitoring system 106 may have neither user input interfaces nor displays and may instead receive and display content using another device (e.g., a dedicated display device such as a computer screen or a dedicated input device such as a remote control, mouse, voice input, etc.).

One or more components or devices in the system 100 may include electronic storages. The electronic storages may include non-transitory storage media that electronically stores information. The electronic storage media of the electronic storages may include one or both of (a) system storage that is provided integrally (e.g., substantially non-removable) with servers or client devices or (ii) removable storage that is removably connectable to the servers or client devices via, for example, a port (e.g., a Universal Serial Bus (USB) port, a firewire port, etc.) or a drive (e.g., a disk drive, etc.). The electronic storages may include one or more of optically readable storage media (e.g., optical discs, etc.), magnetically readable storage media (e.g., magnetic tape, magnetic hard drive, floppy drive, etc.), electrical charge-based storage media (e.g., EEPROM, random access memory (RAM), etc.), solid-state storage media (e.g., flash drive, etc.), or other electronically readable storage media. The electronic storages may include one or more virtual storage resources (e.g., cloud storage, a virtual private network, or other virtual storage resources). The electronic storages may store software algorithms, information determined by the processors, information obtained from servers, information obtained from client devices, or other information that enables the functionality as described herein.

FIG. 1 also includes a network 150. The network 150 may be the Internet, a mobile phone network, a mobile voice or data network (e.g., a 5G or LTE network), a cable network, a satellite network, a combination of these networks, or other types of communications networks or combinations of communications networks. The devices in FIG. 1 (e.g., error reporting system 102, the user device 104, or the monitoring system 106) may communicate (e.g., with each other or other computing systems not shown in FIG. 1) via the network 150 using one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The devices in FIG. 1 may include additional communication paths linking hardware, software, or firmware components operating together. For example, the error reporting system 102, any component of the processing system (e.g., the communication subsystem 112, the ML subsystem 114, or the memory buffer 116), the user device 104, or the monitoring system 106 may be implemented by one or more computing platforms.

Figure 3:
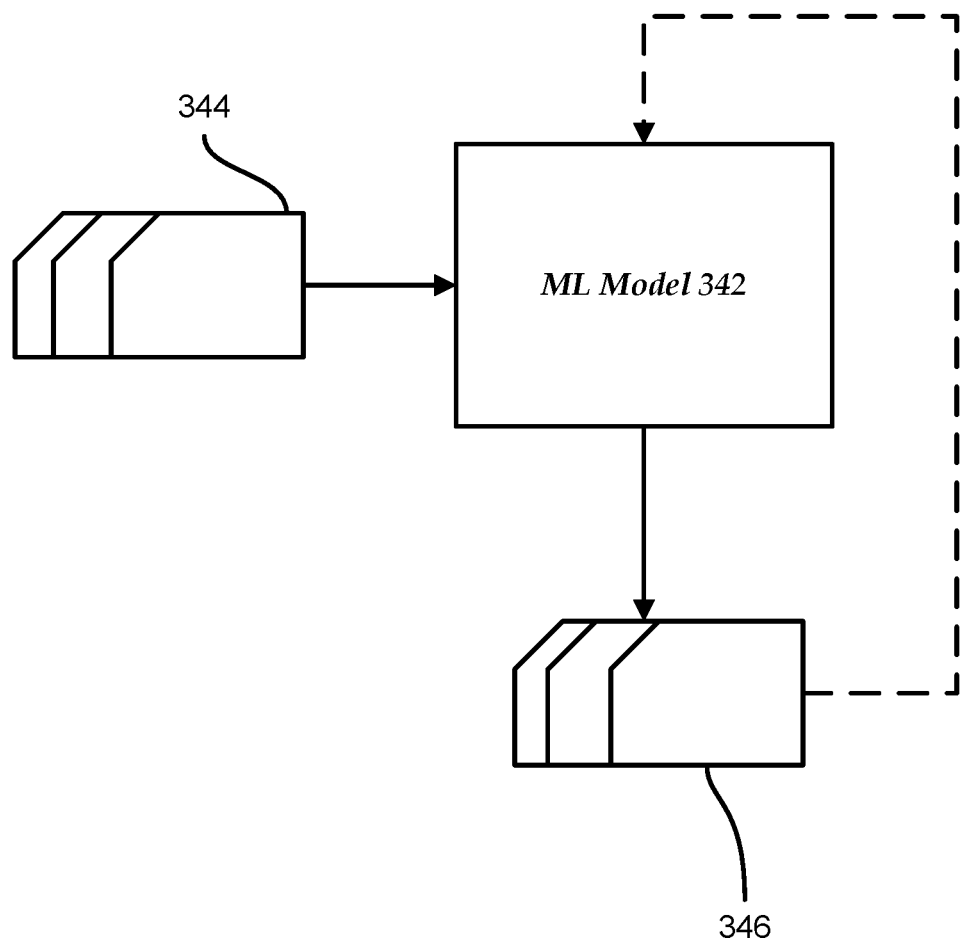
FIG. 3 shows an example machine learning model, in accordance with some embodiments.

One or more machine learning models discussed above may be implemented (e.g., in part), for example, as shown in FIGS. 1-3. With respect to FIG. 3, machine learning model 342 may take inputs 344 and provide outputs 346. In one use case, outputs 346 may be fed back to machine learning model 342 as input to train machine learning model 342 (e.g., alone or in conjunction with user indications of the accuracy of outputs 346, labels associated with the inputs, or with other reference feedback information). In another use case, machine learning model 342 may update its configurations (e.g., weights, biases, or other parameters) based on its assessment of its prediction (e.g., outputs 346) and reference feedback information (e.g., user indication of accuracy, reference labels, or other information). In another example use case, machine learning model 342 is a neural network and connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 342 may be trained to determine whether a DOM copy is similar to a corresponding screenshot with better accuracy, recall, or precision.

In some embodiments, the machine learning model 342 may include an artificial neural network. In some embodiments, machine learning model 342 may include an input layer and one or more hidden layers. Each neural unit of the machine learning model may be connected with one or more other neural units of the machine learning model 342. Such connections can be enforcing or inhibitory in their effect on the activation state of connected neural units. Each individual neural unit may have a summation function which combines the values of all of its inputs together. Each connection (or the neural unit itself) may have a threshold function that a signal must surpass before it propagates to other neural units. The machine learning model 342 may be self-learning or trained, rather than explicitly programmed, and may perform significantly better in certain areas of problem solving, as compared to computer programs that do not use machine learning. During training, an output layer of the machine learning model 342 may correspond to a classification, and an input known to correspond to that classification may be input into an input layer of the machine learning model during training During testing, an input without a known classification may be input into the input layer, and a determined classification may be output. For example, the classification may be an indication of whether an action is predicted to be completed by a corresponding deadline or not. The machine learning model 342 trained by the machine learning subsystem 114 may include one or more embedding layers at which information or data (e.g., any data or information discussed above in connection with FIGS. 1-3) is converted into one or more vector representations. The one or more vector representations of the message may be pooled at one or more subsequent layers to convert the one or more vector representations into a single vector representation.

The machine learning model 342 may be structured as a factorization machine model. The machine learning model 342 may be a non-linear model or supervised learning model that can perform classification or regression. For example, the machine learning model 342 may be a general-purpose supervised learning algorithm that the system uses for both classification and regression tasks. Alternatively, the machine learning model 342 may include a Bayesian model configured to perform variational inference. The machine learning model 342 may be configured to determine whether two datasets are similar, to generate a vector representation of a dataset or a portion of a dataset, or a variety of other functions described above in connection with FIGS. 1-2B.

Figure 4:
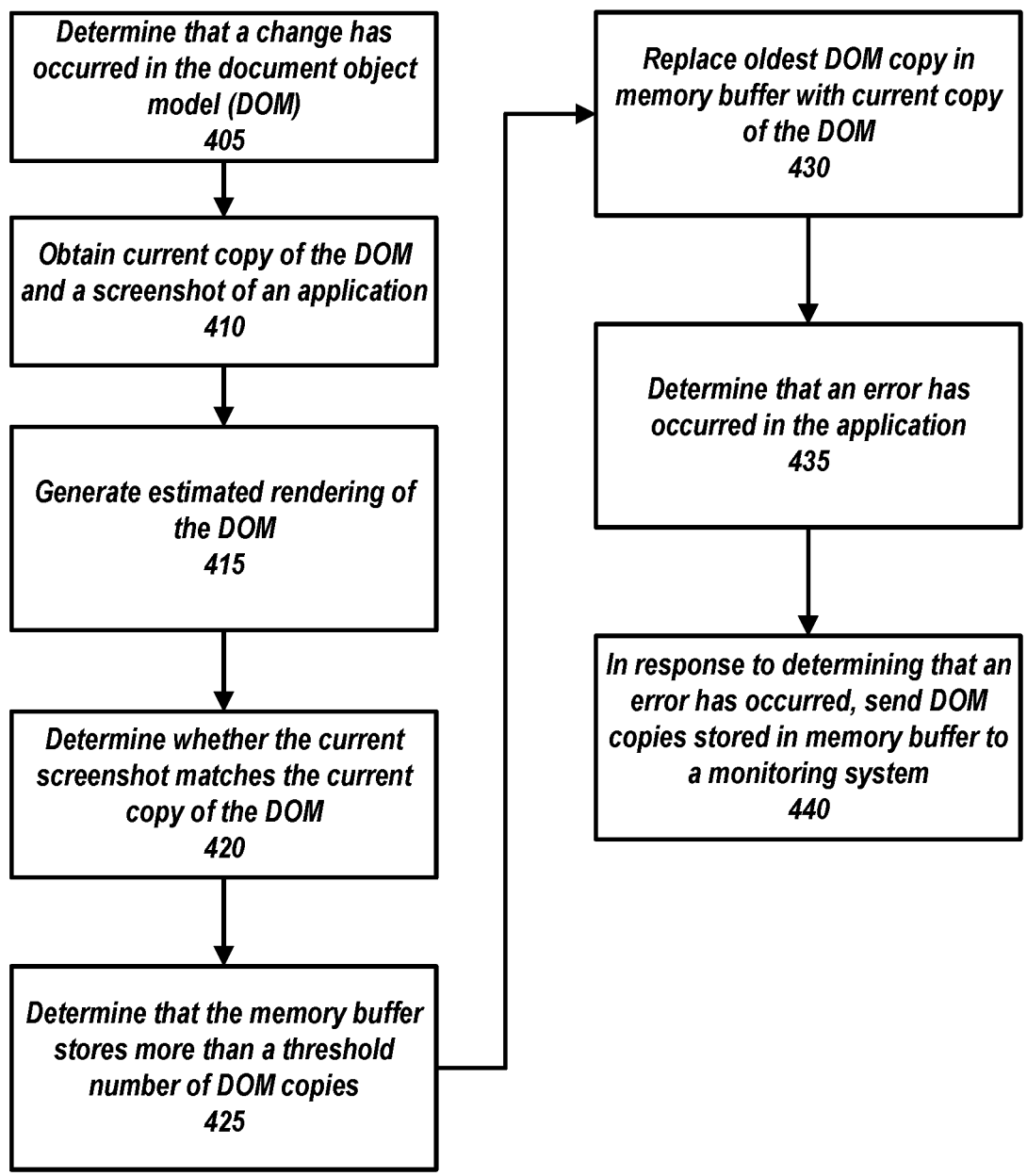
FIG. 4 shows an example flowchart of the actions involved in using targeted data to report software errors, in accordance with some embodiments.

FIG. 4 is an example flowchart of processing operations of a method that enables the various features and functionality of the systems as described in detail above. The processing operations presented below are intended to be illustrative and non-limiting. In some embodiments, for example, the method may be accomplished with one or more additional operations not described, or without one or more of the operations discussed. Additionally, the order in which the processing operations of the methods are illustrated (and described below) is not intended to be limiting.

Figure 5:
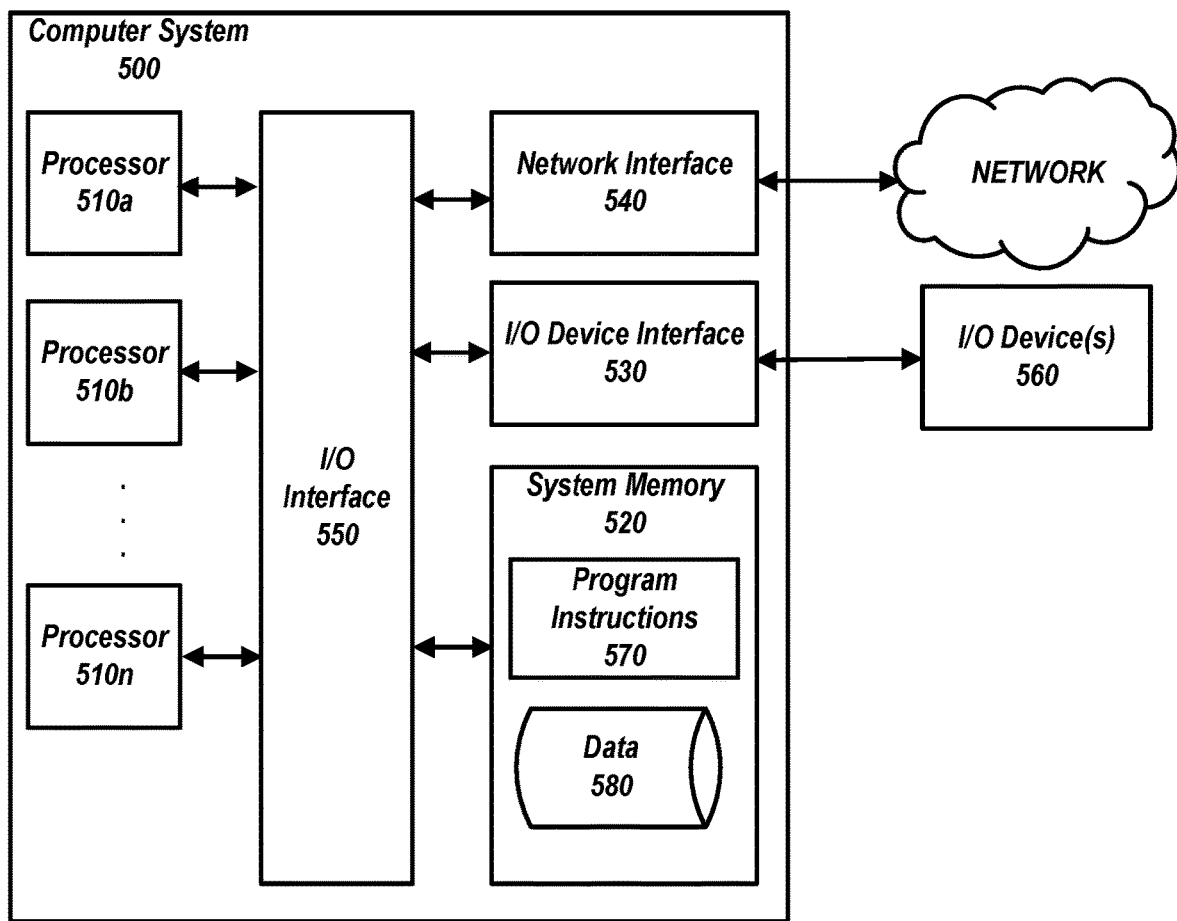
FIG. 5 shows an example computing system that may be used in accordance with some embodiments.

In some embodiments, the method may be implemented in one or more processing devices (e.g., a digital processor, an analog processor, a digital circuit designed to process information, an analog circuit designed to process information, a state machine, or other mechanisms for electronically processing information). The processing devices may include one or more devices executing some or all of the operations of the methods in response to instructions stored electronically on an electronic storage medium. The processing devices may include one or more devices configured through hardware, firmware, or software to be specifically designed for execution of one or more of the operations of the methods. It should be noted that the operations performed by error reporting system 102 may be performed using one or more components in system 100 (FIG. 1) or computer system 500 (FIG. 5).

FIG. 4 shows an example flowchart of the actions involved in reporting software errors. For example, process 400 may represent the actions taken by one or more devices shown in FIGS. 1-3 and described above. At 405, error reporting system 102 determines that a change has occurred in the document object model (DOM). For example, a user may interact with a web application causing new data to be displayed. The DOM may comprise a tree structure with nodes that are representative of portions of a web page. The change to the DOM may indicate that the change was made without input from a user.

At 410, error reporting system 102 may obtain a current copy of the DOM and a screenshot of the web application. The screenshot may be taken in response to determining that there was a change to the web application. The screenshot may include an image of an interface (e.g., a graphical user interface) where the web application is rendered for display. The screenshot may be used to compare with a rendering of the DOM to determine whether the DOM is accurate.

At 415, error reporting system 102 may generate an estimated rendering of the DOM. For example, the error reporting system 102 may use data stored in the DOM to generate an HTML document.

At 420, error reporting system 102 may determine whether the current screenshot matches the current copy of the DOM. For example, the error reporting system 102 may use the current copy of the DOM to generate an additional screenshot. The two screenshots may be compared, for example, using a machine learning model. If a similarity score generated by the machine learning model for the two screenshots is above a threshold score, the error reporting system 102 may determine that the current screenshot matches the current copy of the DOM.

At 425, error reporting system 102 may determine that the memory buffer stores more than a threshold number of DOM copies. At 430, the error reporting system 102 may replace the oldest DOM copy in the memory buffer with the current copy of the DOM. The error reporting system 102 may replace the oldest DOM copy in response to determining that the memory buffer stores more than the threshold number of DOM copies or in response to determining that the current screenshot matches the current copy of the DOM. The memory buffer may store a plurality of DOM copies that correspond to previous changes made to the DOM (or an application corresponding to the DOM).

At 435, the error reporting system 102 may determine that an error has occurred in the application. For example, the error reporting system 102 may determine that the application has crashed or is otherwise not working as intended.

At 440, the error reporting system 102 may send the DOM copies stored in the memory buffer to a monitoring system. For example, the error reporting system 102 may determine that a web application has crashed, and in response may send the contents of the memory buffer to a monitoring system. The DOM copies or screenshots stored in the memory buffer may be used to determine the cause of an error in an application and may allow a fix to the error to be created more efficiently.

It is contemplated that the actions or descriptions of FIG. 4 may be used with any other embodiment of this disclosure. In addition, the actions and descriptions described in relation to FIG. 4 may be done in alternative orders or in parallel to further the purposes of this disclosure. For example, each of these actions may be performed in any order, in parallel, or simultaneously to reduce lag or increase the speed of the system or method. Furthermore, it should be noted that any of the devices or equipment discussed in relation to FIGS. 1-3 or FIG. 5 could be used to perform one or more of the actions in FIG. 4.

FIG. 5 is a diagram that illustrates an exemplary computing system 500 in accordance with embodiments of the present technique. Various portions of systems and methods described herein may include or be executed on one or more computer systems similar to computing system 500. Further, processes and modules described herein may be executed by one or more processing systems similar to that of computing system 500.

Computing system 500 may include one or more processors (e.g., processors 510a-510n) coupled to system memory 520, an I/O device interface 530, and a network interface 540 via an I/O interface 550. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of computing system 500. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 520). Computing system 500 may be a units-processor system including one processor (e.g., processor 510a), or a multi-processor system including any number of suitable processors (e.g., 510a-510n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 500 may include a plurality of computing devices (e.g., distributed computer systems) to implement various processing functions.

I/O device interface 530 may provide an interface for connection of one or more I/O devices 560 to computer system 500. I/O devices may include devices that receive input (e.g., from a user) or output information (e.g., to a user). I/O devices 560 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 560 may be connected to computer system 500 through a wired or wireless connection. I/O devices 560 may be connected to computer system 500 from a remote location. I/O devices 560 located on a remote computer system, for example, may be connected to computer system 500 via a network and network interface 540.

Network interface 540 may include a network adapter that provides for connection of computer system 500 to a network. Network interface 540 may facilitate data exchange between computer system 500 and other devices connected to the network. Network interface 540 may support wired or wireless communication. The network may include an electronic communication network, such as the Internet, a local area network (LAN), a wide area network (WAN), a cellular communications network, or the like.

System memory 520 may be configured to store program instructions 570 or data 580. Program instructions 570 may be executable by a processor (e.g., one or more of processors 510a-510n) to implement one or more embodiments of the present techniques. Instructions 570 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 520 may include a tangible program carrier having program instructions stored thereon. A tangible program carrier may include a non-transitory computer-readable storage medium. A non-transitory computer-readable storage medium may include a machine-readable storage device, a machine-readable storage substrate, a memory device, or any combination thereof. Non-transitory computer-readable storage medium may include non-volatile memory (e.g., flash memory, ROM, PROM, EPROM, EEPROM memory), volatile memory (e.g., RAM, static random access memory (SRAM), synchronous dynamic RAM (SDRAM)), bulk storage memory (e.g., CD-ROM or DVD-ROM, hard-drives), or the like. System memory 520 may include a non-transitory computer-readable storage medium that may have program instructions stored thereon that are executable by a computer processor (e.g., one or more of processors 510a-510n) to cause the subject matter and the functional operations described herein. A memory (e.g., system memory 520) may include a single memory device or a plurality of memory devices (e.g., distributed memory devices).

I/O interface 550 may be configured to coordinate I/O traffic between processors 510a-510n, system memory 520, network interface 540, I/O devices 560, or other peripheral devices. I/O interface 550 may perform protocol, timing, or other data transformations to convert data signals from one component (e.g., system memory 520) into a format suitable for use by another component (e.g., processors 510a-510n). I/O interface 550 may include support for devices attached through various types of peripheral buses, such as a variant of the Peripheral Component Interconnect (PCI) bus standard or the USB standard.

Embodiments of the techniques described herein may be implemented using a single instance of computer system 500 or multiple computer systems 500 configured to host different portions or instances of embodiments. Multiple computer systems 500 may provide for parallel or sequential processing/execution of one or more portions of the techniques described herein.

Those skilled in the art will appreciate that computer system 500 is merely illustrative and is not intended to limit the scope of the techniques described herein. Computer system 500 may include any combination of devices or software that may perform or otherwise provide for the performance of the techniques described herein. For example, computer system 500 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 500 may also be connected to other devices that are not illustrated or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. In some embodiments, some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network or a wireless link Various embodiments may further include receiving, sending, or storing instructions or data implemented in accordance with the foregoing description upon a computer-accessible medium. Accordingly, the present disclosure may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine-readable medium. In some cases, third-party content delivery networks may host some or all of the information conveyed over networks, in which case, to the extent information (e.g., content) is said to be supplied or otherwise provided, the information may be provided by sending instructions to retrieve that information from a content delivery network.

Due to costs constraints, some features disclosed herein may not be presently claimed and may be claimed in later filings, such as continuation applications or by amending the present claims. Similarly, due to space constraints, neither the Abstract nor the Summary section of the present document should be taken as containing a comprehensive listing of all such disclosures or all aspects of such disclosures.

It should be understood that the description and the drawings are not intended to limit the disclosure to the particular form disclosed, but to the contrary, the intention is to cover all modifications, equivalents, and alternatives falling within the spirit and scope of the present disclosure as defined by the appended claims. Further modifications and alternative embodiments of various aspects of the disclosure will be apparent to those skilled in the art in view of this description. Accordingly, this description and the drawings are to be construed as illustrative only and are for the purpose of teaching those skilled in the art the general manner of carrying out the disclosure. It is to be understood that the forms of the disclosure shown and described herein are to be taken as examples of embodiments. Elements and materials may be substituted for those illustrated and described herein, parts and processes may be reversed or omitted, and certain features of the disclosure may be utilized independently, all as would be apparent to one skilled in the art after having the benefit of this description of the disclosure. Changes may be made in the elements described herein without departing from the spirit and scope of the disclosure as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "the element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y," "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing actions A, B, C, and D) encompasses both all such attributes or functions being mapped to all such objects and subsets of the attributes or functions being mapped to subsets of the attributes or functions (e.g., both all processors each performing actions A-D, and a case in which processor 1 performs action A, processor 2 performs action B and part of action C, and processor 3 performs part of action C and action D), unless otherwise indicated. Further, unless otherwise indicated, statements that one value or action is "based on" another condition or value encompass both instances in which the condition or value is the sole factor and instances in which the condition or value is one factor among a plurality of factors. The term "each" is not limited to "each and every" unless indicated otherwise. Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems or methods described above may be applied to, or used in accordance with, other systems or methods.

The present techniques will be better understood with reference to the following enumerated embodiments:

1. A method comprising: monitoring a document object model (DOM) corresponding to an application; in response to determining that the change has occurred in the DOM, obtaining a current copy of the DOM; determining that a stored number of DOM copies meets a threshold; in response to determining that the stored number of DOM copies meets the threshold, replacing a DOM copy of a first plurality of DOM copies, stored in a memory buffer, with the current copy of the DOM; detecting an error within the web application; and in response to detecting the error, sending the first plurality of DOM copies to a monitoring system.
2. The method of any of the preceding embodiments, further comprising: in response to determining that the change has occurred in the DOM, obtaining a current screenshot of a screen displaying the application, wherein the current screenshot comprises a first image of an interface of the application as it is rendered for display; generating, based on the current copy of the DOM, an estimated rendering of the application; determining that the current screenshot matches the current copy of the DOM; and in response to determining that the current screenshot matches the current copy of the DOM, discarding the current screenshot.
3. The method of any of the preceding embodiments, wherein determining that the current screenshot matches the current copy of the DOM comprises: generating, based on the current copy of the DOM, a second screenshot; determining, via a machine learning model and based on a comparison of the current screenshot and the second screenshot, a similarity metric; and in response to determining that the similarity metric satisfies a second threshold, determining that the current screenshot matches the current copy of the DOM.
4. The method of any of the preceding embodiments, wherein determining that a change has occurred in the DOM comprises: retrieving metadata associated with the DOM; and determining, based on the metadata, that the change has occurred in the DOM.
5. The method of any of the preceding embodiments, further comprising: in response to determining that the change has occurred in the DOM, obtaining a current screenshot of a screen displaying the web application; determining that the current screenshot does not match the current copy of the DOM; and in response to determining that the current screenshot does not match the current copy of the DOM, storing the current screenshot in the memory buffer.
6. The method of any of the preceding embodiments, wherein sending the first plurality of DOM copies to a monitoring system comprises: determining, based on an error type of the error within the web application, a subset of the first plurality of DOM copies; and sending the subset of the DOM copies to the monitoring system.
7. The method of any of the preceding embodiments, wherein sending the first plurality of DOM copies to a monitoring system comprises: determining a second plurality of DOM copies associated with a previous error, wherein the second plurality of DOM copies have been previously sent to the monitoring system; determining, based on a comparison between the second plurality of DOM copies and the first plurality of DOM copies, a subset of the first plurality of DOM copies that do not match DOM copies in the second plurality of DOM copies; and sending the subset to the monitoring system.
8. The method of any of the preceding embodiments, wherein detecting an error within the web application comprises: receiving input indicating that an error report should be sent to the monitoring system; and determining, based on the input, the web application from a plurality of web applications.
9. The method of any of the preceding embodiments, wherein replacing an oldest DOM copy of a first plurality of DOM copies comprises: retrieving a data structure that stores time stamps associated with the first plurality of DOM copies; and determining, based on the time stamps, the oldest DOM copy.
10. A tangible, non-transitory, machine-readable medium storing instructions that, when executed by a data processing apparatus, cause the data processing apparatus to perform operations comprising those of any of embodiments 1-9.
11. A system comprising: one or more processors; and memory storing instructions that, when executed by the processors, cause the processors to effectuate operations comprising those of any of embodiments 1-9.
12. A system comprising means for performing any of embodiments 1-9.

What is claimed is:

1. A system for selectively storing DOM copies and using the DOM copies to detect application errors, the system comprising one or more processors and one or more non-transitory, machine-readable media storing program instructions that, when executed by the one or more processors, perform operations comprising:
monitoring a document object model (DOM) corresponding to a web application;
obtaining, based on a change occurring in the DOM, a first copy of the DOM that represents the DOM resulting from the change;
causing, based on a DOM storage threshold being satisfied, replacement of a second copy of a set of DOM copies in storage with the first copy of the DOM, wherein each DOM copy of the set of DOM copies corresponds to a previous change made to the DOM;
detecting an error within the web application; and
sending, based on the detection of the error, the set of DOM copies to a monitoring system.

2. The system of claim 1, the operations further comprising:
obtaining a screenshot of a screen display of the web application;
generating, based on the first copy of the DOM, an estimated rendering of the web application;
determining that the estimated rendering matches the screenshot; and
determining that the DOM storage threshold is satisfied based on the match between the estimated rendering and the screenshot.

3. The system of claim 1, wherein the DOM storage threshold is a first DOM storage
threshold, the operations further comprising:
obtaining a screenshot of a screen display of the web application;
generating, based on the first copy of the DOM, an estimated rendering of the web application;
determining a similarity score based on the estimated rendering and the screenshot;
determining that the first DOM storage threshold is satisfied based on the similarity score; and
determining that a second DOM storage threshold is not satisfied based on the similarity score, wherein:
causing the first copy to be added to the set of DOM copies in the storage comprises causing the screenshot to be added to a set of screenshots based on a determination that the similarity score satisfies the first DOM storage threshold but does not satisfy the second DOM storage threshold; and
sending the set of DOM copies to the monitoring system comprises sending the screenshot to the monitoring system.

4. A method comprising:
monitoring a document object model (DOM) corresponding to an application;
obtaining, based on a change occurring in the DOM, a first copy of the DOM that represents the DOM resulting from the change;
causing, based on a DOM storage threshold being satisfied, the first copy to be added to a set of DOM copies in storage, wherein each DOM copy of the set of DOM copies corresponds to a previous change made to the DOM;
detecting an error within the application; and
sending, based on the detection of the error, the set of DOM copies to a monitoring system.

5. The method of claim 4, wherein the DOM storage threshold is a numeric value, further comprising:
generating a rendering based on the first copy;
generating a first vector by providing the rendering to a machine learning model;
generating a second vector by providing a screenshot of the application to the machine learning model;
determining a similarity score based on the first and second vectors; and
determining that the DOM storage threshold is satisfied based on the similarity score.

6. The method of claim 4, further comprising detecting the change occurring in the DOM
based on a detected user input into the application.

7. The method of claim 4, wherein:
the storage comprises a plurality of DOM copies;
the plurality of DOM copies comprises the set of DOM copies, and wherein a count of DOM copies of the plurality of DOM copies is greater than a count of DOM copies of the set of DOM copies;
detecting the error comprises detecting a web application associated with the DOM has crashed or become unresponsive; and
sending the set of DOM copies comprises sending the plurality of DOM copies based on the detection that the web application has crashed or become unresponsive.

8. The method of claim 4, wherein the error is a first error, further comprising:
obtaining a later copy of a second DOM;
causing, based on the DOM storage threshold being satisfied based on the later copy, the later copy to be added to the set of DOM copies;
detecting a second error, wherein detecting the second error comprises determining an error type associated with the second error;
based on the determination that the error type associated with the second error matches a first known error type, removing the later copy from the set of DOM copies.

9. The method of claim 4, further comprising determining a most recent DOM copy of the set of DOM copies, wherein causing the first copy to be added to the set of DOM copies comprises replacing the most recent DOM copy of the set of DOM copies with the first copy.

10. The method of claim 4, further comprising determining an oldest DOM copy of the set of DOM copies, wherein causing the first copy to be added to the set of DOM copies comprises replacing the oldest DOM copy of the set of DOM copies with the first copy.

11. The method of claim 4, further comprising:
determining an application type of the application;
retrieving a DOM-specific storage maximum mapped to the application type;
determining a result indicating that a count of DOM copies of the set of DOM copies satisfies the DOM-specific storage maximum; and
discarding a DOM copy of the set of DOM copies based on the DOM storage threshold being satisfied and the result indicating that the count of DOM copies of the set of DOM copies satisfies the DOM-specific storage maximum.

12. The method of claim 11, wherein:
the application type is a first application type that indicates a web application;
the DOM storage threshold is a first numeric value;
determining the application type comprises selecting the first application type in lieu of a second application type indicating a mobile application; and
the second application type is mapped to a second DOM storage threshold that is less than first DOM storage threshold.

13. One or more non-transitory, machine-readable media storing program instructions that, when executed by one or more processors, causes the one or more processors to perform operations comprising:
monitoring a document object model (DOM) corresponding to an application;
obtaining, based on a change occurring in the DOM, a first copy of the DOM that represents the DOM resulting from the change;
causing, based on a DOM storage threshold being satisfied, the first copy to be added to a set of DOM copies in storage, wherein each DOM copy of the set of DOM copies corresponds to a previous change made to the DOM;
detecting an error within the application; and
sending, based on the detection of the error, the set of DOM copies to a monitoring system.

14. The one or more machine-readable media of claim 13, wherein causing the first copy to be added to the set of DOM copies in the storage comprises causing a replacement of a second copy of the set of DOM copies in the storage with the first copy of the DOM.

15. The one or more machine-readable media of claim 13, wherein the DOM storage threshold is a numeric value, the operations further comprising:
   determining a similarity score based on a screenshot of the application and the first copy; and
   determining a result indicating that the DOM storage threshold is satisfied based on a result indicating that the similarity score is above the numeric value.

16. The one or more machine-readable media of claim 13, further comprising detecting the change occurring in the DOM based on a detected user input into the application.

17. The one or more machine-readable media of claim 13, wherein:
   the storage comprises a plurality of DOM copies;
   the plurality of DOM copies comprises the set of DOM copies, and wherein a count of DOM copies of the plurality of DOM copies is greater than a count of DOM copies of the set of DOM copies;
   detecting the error comprises detecting that the application has crashed or become unresponsive; and
   sending the set of DOM copies comprises sending the plurality of DOM copies based on the detection that the application has crashed or become unresponsive.

18. The one or more machine-readable media of claim 13, wherein the error is a first error, further comprising:
   obtaining a later copy of a second DOM;
   causing, based on the DOM storage threshold being satisfied based on the later copy, the later copy to be added to the set of DOM copies;
   detecting a second error, wherein detecting the second error comprises determining an error type associated with the second error;
   based on the determination that the error type associated with the second error matches a first known error type, removing the later copy from the set of DOM copies.

19. The one or more machine-readable media of claim 13, further comprising expanding a data storage capacity of the storage based on an amount of DOM data stored in the storage.

20. The one or more machine-readable media of claim 13, the operations further comprising:
   obtaining, after obtaining the first copy, a later copy of the DOM and a later screenshot associated with the later copy;
   determining a similarity score based on the later copy and the later screenshot;
   determining that the DOM storage threshold is not satisfied based on the similarity score; and
   storing the later screenshot in a set of screenshots without storing the later copy in the set of DOM copies based on the determination that the DOM storage threshold is not satisfied.

* * * * *